United States Patent [19]

Allen et al.

[11] 4,191,308

[45] Mar. 4, 1980

[54] TABLET DISPENSER FOR FUMIGATING AGRICULTURAL COMMODITIES

[75] Inventors: James R. Allen, Salina; Alvin T. Hammes, Shawnee Mission, both of Kans.

[73] Assignee: Research Products Company, Salina, Kans.

[21] Appl. No.: 942,647

[22] Filed: Sep. 15, 1978

[51] Int. Cl.² .............................................. B65H 3/60
[52] U.S. Cl. ..................................... 221/202; 221/265; 221/285
[58] Field of Search ............... 221/265, 202, 237, 281; 222/370

[56] References Cited

U.S. PATENT DOCUMENTS

| | | | |
|---|---|---|---|
| 2,923,436 | 2/1960 | Koehn | 221/265 |
| 3,246,806 | 4/1966 | McBride, Jr. | 222/203 |
| 3,330,442 | 7/1967 | O'Connor | 221/265 |
| 3,706,396 | 12/1972 | Knapp | 221/265 |
| 3,785,525 | 1/1974 | Handeland | 221/265 |
| 3,885,703 | 5/1975 | Neavin | 221/202 |
| 3,991,908 | 11/1976 | Thomas | 221/154 |
| 4,024,984 | 5/1977 | Gyimothy et al. | 221/265 X |

Primary Examiner—Allen N. Knowles
Attorney, Agent, or Firm—Fishburn, Gold & Litman

[57] ABSTRACT

A tablet dispenser for fumigating agricultural commodities, such as grain, animal feed, and the like, comprises a container shaped to receive a plurality of pesticide tablets therein, and including a base with a dispenser aperture therethrough. A rotor is rotatively mounted in the container base, and includes an upper portion, a medial portion, and a lower portion. The medial portion of the rotor is spaced apart from the container sidewall, and forms an annularly shaped channel therebetween which is proportioned to receive therein a single file ring of the pesticide tablets, each oriented on a circumferential edge thereof. The lower portion of the rotor extends outwardly of the medial portion to form a base surface of the channel on which the tablets are supported, and includes a dispensing aperture therethrough positioned for selective alignment with the container base aperture. The upper portion of the rotor is shaped to urge the tablets toward and into the channel, whereby relative rotation between the container and the rotor regularly dispenses the pesticide tablets from the dispenser.

12 Claims, 7 Drawing Figures

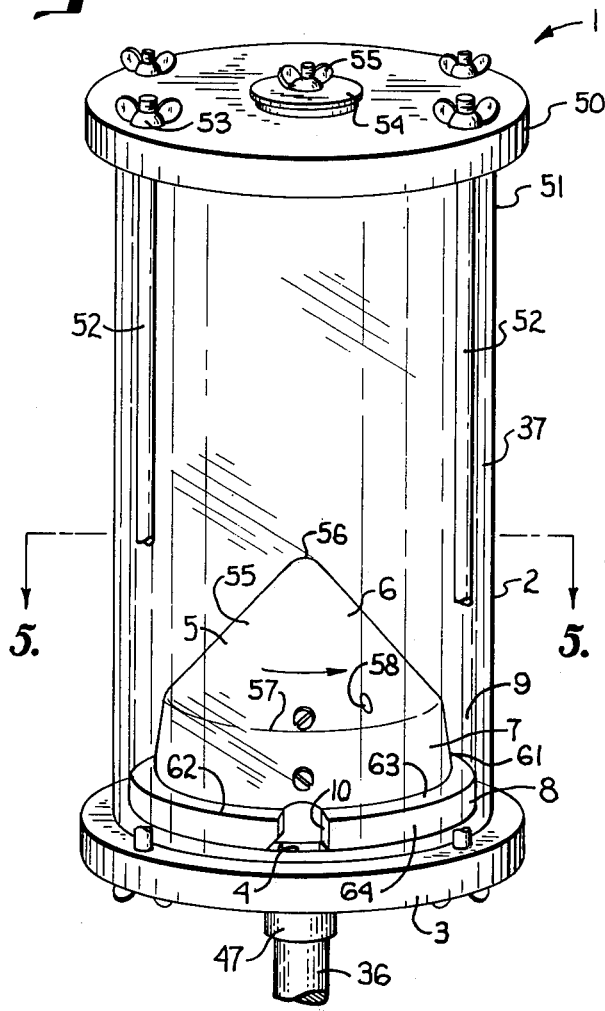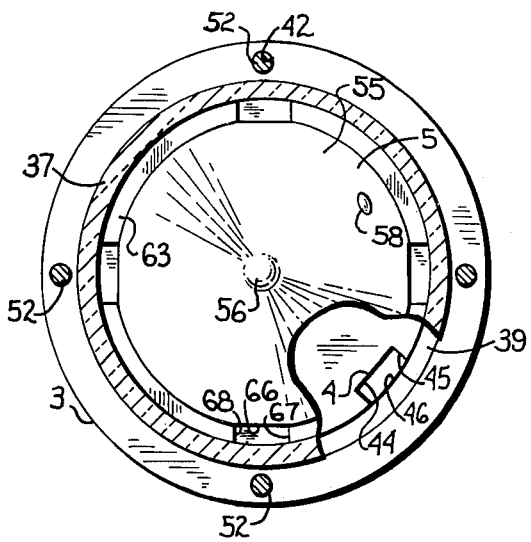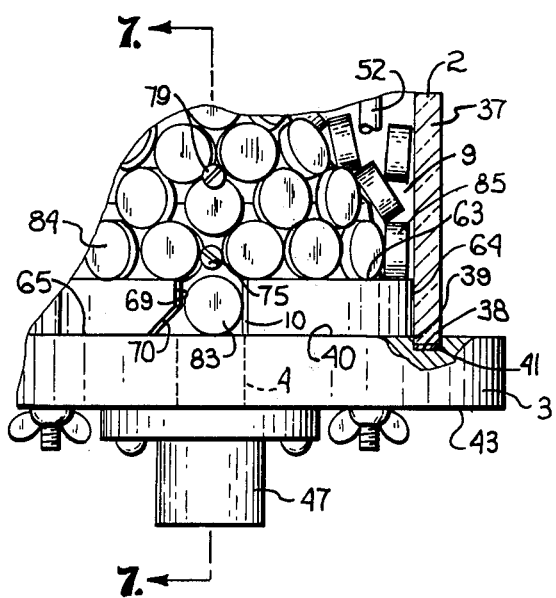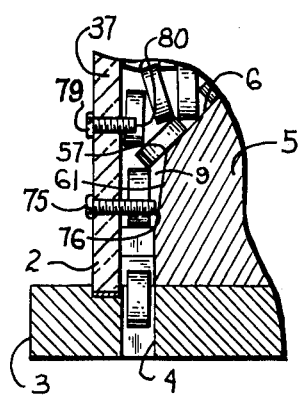

TABLET DISPENSER FOR FUMIGATING AGRICULTURAL COMMODITIES

BACKGROUND OF THE INVENTION

This invention relates to tablet dispensers, and in particular to a pesticide tablet dispenser for fumigating agricultural commodities.

One method for fumigating goods such as raw agricultural commodities, grain, animal feed, and the like, comprises the process of evenly dispensing fumigant tablets into the commodity as it is being loaded into the storage container or transport vehicle. The fumigant tablets are typically made from a pesticide material, such as aluminum phosphide, which reacts with humidity in the atmosphere and emits a toxic gas, in the noted example phosphine, which permeates the commodity and kills the insects therein. The fumigant gases are quite toxic, and therefore hazardous to humans, and the tablets begin to gas as soon as they are exposed to the atmosphere.

Although the tablets may be metered into the commodity manually by workers stationed adjacent to the opening of the grain receptacle, the workers are thereby exposed to the toxic gases for a period of time which extends throughout the grain loading process. Inhalation of the fumigant gases even at such remote working stations can present a hazard to the workers' health. Further, because the workers must be positioned in the proximity of the open loading area of the receptacle, they are subject to a severe safety hazard comprising the exposure to lethal concentrations of fumigant gases should they accidentally fall into the receptacle during fumigation, or otherwise unwittingly enter the fumigation area.

Machines for dispensing the fumigant tablets must be reliable and evenly distribute the tablets throughout the commodity, and further must operate without clogging. Should a fumigant tablet dispenser clog or jam during fumigation, since the tablets continue to gas after exposure to the atmosphere, immediate repair of the machine would be quite dangerous. Further, as the pesticide tablets absorb humidity from the air, the tablets become somewhat softer, and they are therefore more susceptible to breakage, which in turn causes dispenser jamming.

SUMMARY OF THE INVENTION

The principal objects of the present invention are: to provide a tablet dispenser which accurately and reliably dispenses pesticide tablets for fumigating agricultural commodities; to provide such a dispenser which is mechanically operated, and may be remotely controlled to alleviate exposure of workers to the fumigant gas; to provide such a dispenser having a closed tablet container to prevent communicating fumigant gases to the work area; to provide such a dispenser having a rotor shaped for dispensing each and every tablet from the container; to provide such a dispenser having a pair of mating dispensing apertures which are shaped to prevent tablet breakage and consequent dispenser jamming; to provide such a dispenser wherein the rotor includes a cone-shaped upper portion to urge the tablets into an on-edge, dispensing orientation; to provide such a dispenser including a protuberance on the cone portion of the rotor for agitating the tablets and providing continuous feed; to provide such a dispenser wherein the rotor and container sidewall form an annularly shaped channel to receive a single file ring of tablets oriented on a circumferential edge thereof for reliable dispensing of the tablets; to provide such a dispenser including a retaining pin extending into the channel and retaining the tablets therein in a generally stationary state with respect to the rotor; to provide such a dispenser including a protuberance extending into the container above the channel to alleviate clogging of the tablets in the container; and to provide such a dispenser which is efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged, perspective view of a metering portion of the dispenser, with portions thereof broken away.

FIG. 5 is a horizontal cross sectional view of the metering portion taken along line 5—5, FIG. 4.

FIG. 6 is an enlarged, fragementary, front elevational view of the metering portion, shown with tablets being dispensed therefrom.

FIG. 7 is a fragmentary vertical cross sectional view of the metering portion of the dispenser taken along line 7—7, FIG. 6.

DESCRIPTION OF THE PREFERRED EMBODIMENTS

Figure 1:
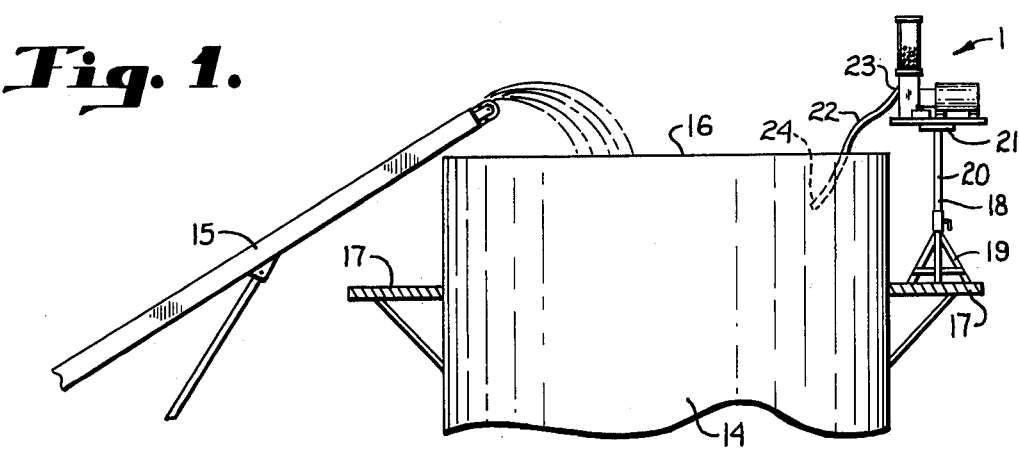
FIG. 1 is a partially schematic elevational view of a tablet dispenser embodying the present invention, being shown in conjunction with a transport device and receptacle for agricultural commodities.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "upper", "lower", "right", "left", "rear", "front", "vertical", "horizontal", and derivatives thereof shall relate to the invention as oriented in FIG. 4, however, it is to be understood that the invention may assume various alternative orientations, except where expressly specified to the contrary.

The reference numeral 1 generally designates a dispenser for use with fumigants in tablet form which are used to kill insects which infest raw agricultural commodities, animal feeds, and like goods. As best illustrated in FIG. 4, the tablet dispenser 1 comprises a container 2 for the pesticide tablets, and includes a base 3 with a dispensing aperture 4 therethrough. A rotor 5 is rotatively mounted in the container base 3, and includes an upper portion 6, a medial portion 7, and a lower portion 8. The medial portion 7 of the rotor is spaced apart from the inside surface of the container 2 and forms a generally annularly shaped channel 9 therebetween which is proportioned to receive therein a single file ring of the pesticide tablets, each being oriented on a circumferential edge thereof. The lower portion 8 of the rotor extends outwardly of the medial portion 7 to form a base surface of the channel 9 on which the tablets are supported, and includes at least one dispensing aperture 10 therethrough positioned for selective alignment with the container base aperture 4. The upper portion 6 of the rotor is shaped to urge the tablets 4 toward and into the channel 9, whereby relative rotation between the container 2 and the rotor 5 regularly dispenses the tablets therefrom.

As best shown in FIG. 1, the illustrated tablet dispenser 1 is particularly well adapted for use in fumigating large receptacles or containers 14 of agricultural commodities, such as silos, rail cars, grain elevators, and the like. A conveyor mechanism 15 transports the commodity from a storage area (not shown) to an upper, open end 16 of the container 14, and the commodity is deposited therein. A support surface is typically provided about the open end 16 of the commodity container 14 to provide a working area for workers, and the same is schematically shown in FIG. 1 by a platform 17. In this example, the tablet dispenser 1 is supported by an adjustable stand 18, having a three legged base 19, a telescopically adjustable column 20, and a mounting plate 21 innerconnecting the upper end of the column 20 to the tablet dispenser 1. An elongate section of flexible conduit 22 has one end 23 thereof communicating with the container dispensing aperture 4, and the free end 24 of the conduit is positioned within the commodity container 14 and adapted to direct the tablets therein. The stand 18 may be vertically adjusted so as to position the tablet dispenser above the side wall of the commodity container 14, such that tablets dispensed from the dispenser 1 will fall under gravitational forces through the conduit 22 into the commodity container 14.

Figure 2:
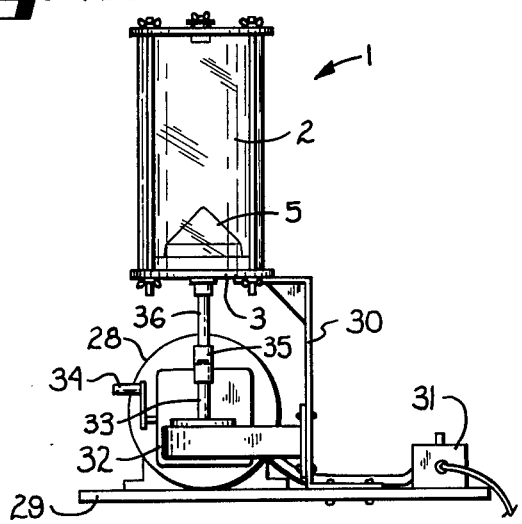
FIG. 2 is a side elevational view of the tablet dispenser.
Figure 3:
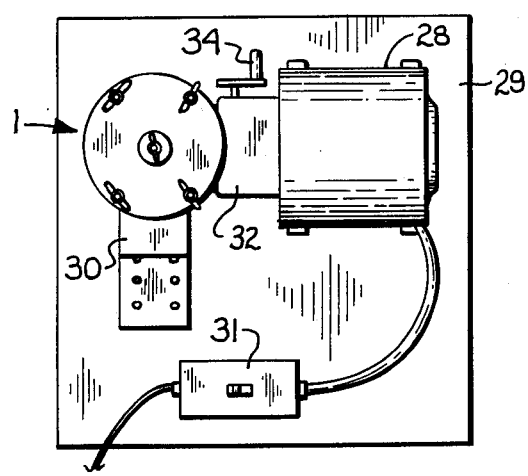
FIG. 3 is a top plan view of the tablet dispenser.

As best illustrated in FIGS. 2 and 3, the container 2, base 3, and rotor 5, comprise a metering portion of the dispenser which is driven by a motor 28. The motor 28 is attached to a planar base member 29, which in turn attaches the metering portion of the dispenser thereto by an upstanding bracket 30. The illustrated motor 28 is an electric motor connected to a power source (not shown) through a switch 31, and includes a variable speed transmission mechanism 32 to vary the speed of the output drive shaft 33. The variable speed transmission 32 includes a control arm 34 which is manipulated by the user to vary the rotational speed of the output shaft 33. A flexible coupling 35 interconnects the output drive shaft 33 of the motor 28 with the rotor drive shaft 36, so as to insure alignment therebetween.

The illustrated container 2 (FIGS. 4–7) is a cylindrically shaped structure having a transparent sidewall 37 such that the operator may visually observe the tablets being dispensed from the apparatus. The container base 3 is disc shaped, and includes a circular groove 39 in the upper surface 40 thereof, and is adapted to receive the lower end 38 of the container sidewall 37 therein. In the illustrated example, a seal member 41 is positioned between the sidewall end 38 and the bottom surface of the groove 39, and forms a secure air-tight seal therebetween. As best illustrated in FIG. 5, the container base 3 extends radially outwardly of the groove 39 and includes a plurality of circumferentially spaced apertures 42 which are provided to attach the base 3 to the sidewall 37 in a manner hereinafter described in detail. At the center of the container base 3 is provided a circular aperture (not shown) in which the rotor drive shaft 36 is rotatably mounted. The dispensing aperture 4 in the container base 3 extends laterally therethrough between the upper surface 40 and the lower surface 43, and is shaped to permit the tablets to pass therethrough. In the illustrated structure, the dispensing aperture 4 has a flat inward face 44, a pair of opposed, planar side faces 45 extending perpendicularly outwardly of the inward face 44, and an outward face 46 which is shaped arcuately and concentrically with the center of the base 3. The outward face 46 of the illustrated container base distributing aperture 4 is radially positioned substantially coextensive with the inner wall of the groove 39. A flange sleeve 47 is attached to the lower surface 43 of the base 3, is concentric with the dispensing aperture 4, and is shaped to permit the tablets to pass therethrough. The sleeve 47 includes a lower, cylindrically shaped portion 48 which is adapted to connect the conduit 22 with the dispenser with suitable fastening means (not shown).

The container 2 further comprises a top 50 (FIG. 4) which closes the container to alleviate inadvertent exposure of persons to the fumigant gas. The illustrated top 50 is disk shaped, and similar in construction to the container base 3, including a groove and seal arrangement (not shown) in which the upper end 51 of the sidewall 37 is received. A plurality of circumferentially spaced apertures (not shown) are spaced about the top 50 in alignment with the base apertures 42, and receive elongate rods 52 thereinbetween with threaded ends and mating fasteners 53 for releasably urging the top 50 and base 3 together and forming a secure air-tight container. The illustrated top 50 includes an access aperture and mating closure plug 54 to facilitate filling the container with the pesticide tablets. The plug 54 is of the expanding type to seal against the sidewall of the access aperture, and includes a screw mechanism 55 to seal and remove the plug therefrom.

The rotor 5, as best illustrated in FIGS. 4 and 5 is rotatably mounted in the container base 3 for rotation with respect thereto. In the illustrated embodiment, the rotor 5 includes a conically shaped upper portion 6, a medial portion 7, and a ring shaped lower member 8. The cone shaped upper portion 6 of the rotor has a smooth sidewall 55 which is inclined at an angle in the nature of 40° from the vertical, and a rounded or dome shaped tip 56. The conically shaped upper portion 6 of the rotor extends downwardly to a rounded interface 57 with the rotor medial portion 7. A protuberance 58 is connected with the rotor upper portion 6 for agitating the tablets and insuring even tablet flow therethrough. The illustrated protuberance 47 has a smooth, arcuately shaped outer surface which extends a distance in the nature of 5/64 inches beyond the conical sidewall 55, has a diameter in the nature of ⅛ of an inch, and is positioned a distance of approximately 0.421 inches upwardly of the interface line 57.

The medial portion 7 of the rotor 5 has a smooth outer surface 61 which is spaced apart from the lower portion of the container sidewall 37 a distance slightly greater than the thickness of the tablets to be dispensed. Preferably, the height of the medial portion 7 is substantially equal to or slightly greater than the diameter of the tablets. In the illustrated example, the pesticide tablets for which the apparatus is designed to dispense have a diameter and thickness in the nature of ¾ inch, and ¼ inch respectively, and the medial portion outer surface 61 has a vertical height in the nature of 0.875 inches, and is inclined slightly inwardly at an angle of approximately 8°. It is to be understood that all dimensions referenced herein are merely exemplary of one specific embodiment of the present invention and it is contemplated that the same may be appropriately varied in accordance with the particular application.

The lower portion 8 of the rotor 5 comprises a ring 62 which extends radially outwardly of the medial portion outer surface 61, and includes an upper surface 63, an outer surface 64, and a lower surface 65 positioned adjacent to the upper surface 40 of the container base. The rotor dispensing aperture 10 extends between and through the upper and lower surfaces 63 and 65 of the ring 62 and is shaped to permit tablets to pass through. In this example, the ring 62 is provided with four dispensing apertures 10, which are radially coextensive and circumferentially spaced evenly at 90° intervals. Each of the dispensing apertures 10 is shaped similarly to the container dispensing aperture 4, and includes a flat inwardly face 66, a planar leading side face 67 disposed perpendicularly thereto, and a trailing side face 68 having a generally vertically oriented planar portion 69 (FIG. 6), and an inclined portion 70. The inclined portion 70 begins approximately half way down the ring 62, extends at an angle in the nature of 45° in the trailing direction of the rotor, and is designed to alleviate breakage of the tablets during dispensing, and to positively force tablets through the dispensing aperture 4.

The channel 9 is formed between the upper surface 63 of the ring 62, the outer surface 61 of the rotor medial portion 7, and the inside surface of the container sidewall 37 at the lower portion thereof. The channel is annularly shaped, and has a width dimensioned to receive therein a single file ring of the tablets, wherein the tablets are oriented on their circumferential edge as illustrated in FIGS. 6 and 7. As best shown in FIG. 7, the width of the channel 9 is slightly greater than the thickness of the tablets, such that the tablets may freely translate in the channel, but are restricted to a single file arrangement.

As best illustrated in FIGS. 6 and 7, a retaining pin 75 is connected with the container 2, extends into the channel 9, and is adapted to abut pesticide tablets disposed in the channel, and retain the tablets in a generally stationary state with respect to the dispensing rotor 5, such that the tablets in the channel quickly fill each of the rotor dispensing apertures 10 for dependable tablet dispensing. The retaining pin 75 is spaced slightly upwardly of the uppe surface 63 of the ring 62 so that tablets which rotate with and on the ring 62 are engaged by the retaining pin and are retained in a substantially stationary position in the channel 9. The retaining pin illustrated in FIG. 6 is axially aligned with the container dispensing aperture 4, and prevents more than one tablet from being dispensed from the dispenser for each ring and base aperture alignment. The free end 76 of the retaining pin is spaced slightly apart from the outer surface 61 of the rotor medial portion, so as to avoid engagement therebetween, yet engage the tablets which are disposed in the channel 9. The retaining pin 75 may be of any suitable construction, such as the illustrated fastener which is securely engaged with the container sidewall 37.

A second pin or protuberance 79 is connected with and extends into the container 2, with the free end 80 thereof spaced apart from the rotor upper surface 6 a distance greater than the thickness of the tablets, and alleviates clogging or bridging of the tablets during dispensing operation. In this example, the protuberance 79 is in the shape of a fastener, similar to the retaining pin 75, is positioned in vertical alignment therewith, and the protuberance free end 80 is spaced slightly upwardly of the interface 57 (FIG. 7).

In use, the dispenser operator erects the stand 18 on a suitable support surface adjacent to the container in which the agricultural commodity is to be loaded. The flexible conduit 22 is then placed on the inside of the container 14 such that the tablets dispensed from the dispenser 1 will fall freely into a generally central location of the commodity container. The height of the stand is adjusted such that the dispenser is vertically higher than the container side wall, to develop sufficient gravitational forces on the tablets to insure free dispensing from the apparatus and through the flexible conduit. The operator then manipulates the motor control level 34 to a dispensing speed which is preselected in accordance with the speed at which the stored commodity is delivered to the container by the conveyor 15, and the type of commodity involved. The total number of pesticide tablets required to properly fumigate the container 14 is precalculated by the user, and this number of tablets is placed into the dispenser container 2 through the plug 54. The plug is then replaced in the access aperture and is sealingly locked therein. The motor 28 may be activated by a remote control (not shown) or by the illustrated switch 31. Control means (not shown) may be provided to automatically start and stop the dispenser motor 28 upon activation and deactivation respectively of the conveyor 15. After the operator has filled the container 2, sealed the same, and placed the dispenser unit in an operative condition, he immediately leaves the area. As the commodity is loaded into the container 14, the dispenser is activated, whereby the motor 28 rotates the rotor 5 with respect to the container 2, and selectively and sequentially aligns each of the rotor apertures 10 with the dispensing aperture 4 in the container base 3. The illustrated rotor revolves in a counterclockwise direction, as viewed in FIG. 5. When the two dispensing apertures 4 and 10 align, the tablet 83, which is disposed in the associated rotor aperture 10, falls under gravitational forces through the base aperture 4, and is dispensed into the commodity container through the flexible conduit 22. As best illustrated in FIGS. 6 and 7, as the rotor 5 rotates, the conically shaped upper portion 6 urges the tablets outwardly and downwardly into the channel 9 into an on-edge orientation. The tablets positioned immediately adjacent to the rotor upper portion 6 have an interior side face thereof abutting the surface. The channel 9 is shaped so as to position each of the tablets 83 therein on edge, with the tablet side faces 84 in a substantially vertical orientation, whereby the tablets are supported on the circumferential edge 85 thereof. The channel 9 is sufficiently narrow so as to allow only a single file ring of tablets. The tablets disposed within the channel 9 fill each of the rotor dispensing apertures 10 as they are vacated. Frictional forces between the tablets and the rotor, tend to cause the tablets to rotate with the rotor. However, in the channel 9, the retaining pin 75 retains the tablets in the channel in a generally stationary condition with respect to the rotational motion of the dispensing rotor. In this manner, as each of the rotor dispensing apertures 10 is vacated, a stationary tablet in the channel 9 drops downward under gravitational forces into the vacated aperture. The tablets in the channel 9 tend to rotate about their own center of gravity as a result of tangential, frictional abutment with the ring upper surface 63. This motion further assists in the prevention of tablet clogging. The retaining pin 75, further insures that each one of the tablets loaded into the container is dispensed. The protuberance 79 engages the tablets disposed immediately above the channel 9, and which are rotating with the rotor and prevents the same from jamming or binding in this area. As the rotor revolves, the protuberance 58 on the rotor agitates the tablets in the container to facilitate free flow of the tablets into the channel 9.

It is to be understood that while we have illustrated and described certain forms of our invention, it is not to be limited to the specific forms or arrangement of parts herein described and shown.

What is claimed and desired to secure by Letters Patent is:

1. A tablet dispenser for fumigating agricultural commodities, comprising:
   (a) a container shaped for retaining a plurality of pesticide tablets therein; said container having a sidewall, and a base with an aperture therein proportioned to permit the tablets to pass therethrough;
   (b) a dispensing rotor mounted in said container base for rotation therein, and including:
      (1) a first portion having an outer surface thereof spaced apart from said container sidewall and forming an annularly shaped channel therebetween; said channel being shaped to receive therein a single file ring of the tablets, oriented on a circumferential edge thereof;
      (2) a second portion depending from and extending outwardly of said first portion, forming a base surface of said channel on which the tablets are supported, and including a dispensing aperture shaped to permit the tablets to pass therethrough; said rotor dispensing aperture being positioned radially coextensive with said container base aperture for selective alignment therewith;
   (c) means urging the tablets in the container into said channel;
   (d) means rotating said rotor with respect to said container, whereby a tablet is dispensed from said tablet dispenser for each alignment of said base and rotor apertures;
   (e) a retaining pin connected with said container, extending into said channel and adapted to abut tablets disposed in the channel and retain the same in a generally stationary state with respect to said dispensing rotor, whereby the tablets in the channel quickly fill the rotor dispensing aperture for dependable dispensing of the tablets.

2. A tablet dispenser as set forth in claim 1 wherein:
   (a) said retaining pin is axially aligned with said container base aperture, and prevents more than one tablet from being dispensed from the dispenser for each base and rotor aperture alignment.

3. A tablet dispenser as set forth in claim 1 wherein:
   (a) said container includes a top, and is closed for alleviating inadvertent exposure of persons to fumigant gas.

4. A tablet dispenser as set forth in claim 3 wherein:
   (a) said container top includes an access aperture and a mating, sealing closure therefor to facilitate filling the container with the pesticide tablets.

5. A tablet dispenser as set forth in claim 1 wherein:
   (a) said rotor second portion has a height substantially coextensive with the diameter of the tablets.

6. A tablet dispenser for fumigating agricultural commodities, comprising:
   (a) a container shaped for retaining a plurality of pesticide tablets therein; said container having a sidewall, and a base with an aperture therein proportioned to permit the tablets to pass therethrough;
   (b) a dispensing rotor mounted in said container base for rotation therein, and including:
      (1) a first portion having an outer surface thereof spaced apart from said container sidewall and forming an annularly shaped channel therebetween; said channel being shaped to receive therein a single file ring of the tablets, oriented on a circumferential edge thereof;
      (2) a second portion depending from and extending outwardly of said first portion, forming a base surface of said channel on which the tablets are supported, and including a dispensing aperture shaped to permit the tablets to pass therethrough; said rotor dispensing aperture being positioned radially coextensive with said container base aperture for selective alignment therewith;
   (c) means urging the tablets in the container into said channel;
   (d) means rotating said rotor with respect to said container, whereby a tablet is dispensed from said tablet dispenser for each alignment of said base and rotor apertures;
   (e) said rotor including, an upper portion having said tablet urging means thereon, and directing the tablets generally downwardly, and radially outwardly toward said container sidewall and into said channel in an on-edge orientation.

7. A tablet dispenser as set forth in claim 6 including:
   (a) a protuberance connected with said rotor upper portion for agitating the tablets and insuring even tablet flow into the channel.

8. A tablet dispenser as set forth in claim 6 wherein:
   (a) said rotor upper portion has a conical shape which is concentric with said rotor and urges the tablets outwardly into the channel to completely empty the container.

9. A tablet dispenser for fumigating agricultural commodities, comprising:
   (a) a container shaped for retaining a plurality of pesticide tablets therein; said container having a sidewall, and a base with an aperture therein proportioned to permit the tablets to pass therethrough;
   (b) a dispensing rotor mounted in said container base for rotation therein, and including:
      (1) a first portion having an outer surface thereof spaced apart from said container sidewall and forming an annularly shaped channel therebetween; said channel being shaped to receive therein a single file ring of the tablets, oriented on a circumferential edge thereof;
      (2) a second portion depending from and extending outwardly of said first portion, forming a base surface of said channel on which the tablets are supported, and including a dispensing aperture shaped to permit the tablets to pass therethrough; said rotor dispensing aperture being positioned radially coextensive with said container base aperture for selective alignment therewith;
(c) means urging the tablets in the container into said channel;
(d) means rotating said rotor with respect to said container, whereby a tablet is dispensed from said tablet dispenser for each alignment of said base and rotor apertures;
(e) said rotor dispensing aperture includes an inclined portion on a trailing sidewall thereof to alleviate breakage of the tablets during dispensing.

10. A tablet dispenser for fumigating agricultural commodities, comprising:
(a) a container shaped for retaining a plurality of pesticide tablets therein; said container having a sidewall, and a base with an aperture therein proportioned to permit the tablets to pass therethrough;
(b) a dispensing rotor mounted in said container base for rotation therein, and including:
(1) a first portion having an outer surface thereof spaced apart from said container sidewall and forming an annularly shaped channel therebetween; said channel being shaped to receive therein a single file ring of the tablets, oriented on a circumferential edge thereof;
(2) a second portion depending from and extending outwardly of said first portion, forming a base surface of said channel on which the tablets are supported, and including a dispensing aperture shaped to permit the tablets to pass therethrough; said rotor dispensing aperture being positioned radially coextensive with said container base aperture for selective alignment therewith;
(c) means urging the tablets in the container into said channel;
(d) means rotating said rotor with respect to said container, whereby a tablet is dispensed from said tablet dispenser for each alignment of said base and rotor apertures;
(e) said rotor includes an upper portion contiguous with said rotor first portion; and including
(f) a protuberance connected with and extending into said container above said channel; said protuberance having a free end thereof spaced apart from said rotor upper portion a distance greater than the thickness of the tablets, and alleviating clogging of the tablets in the container.

11. A tablet dispenser as set forth in claim 10 wherein:
(a) said rotor upper portion, medial portion, and lower portion are smooth to prevent tablet breakage.

12. A tablet dispenser for fumigating agricultural commodities comprising:
(a) a container shaped for retaining a plurality of pesticide tablets therein; said container having a sidewall, and a base with an aperture therein proportioned to permit the tablets to pass therethrough;
(b) a dispensing rotor mounted in said base for rotation therewith, and including:
(1) an upper portion having means for urging the tablets radially outwardly toward said container sidewall;
(2) a medial portion having an outer surface thereof spaced apart from a lower portion of said container sidewall;
(3) a lower portion comprising a ring extending radially outwardly of said medial portion outer surface and including an upper surface, an outer surface, and a lower surface positioned adjacent to said container base; said ring having an aperture therein extending through the upper and lower surface thereof, and shaped to permit tablets to pass therethrough; said ring aperture being positioned radially coextensive with said base aperture for selective alignment therewith;
(c) an annularly shaped channel formed between said ring upper surface, the medial portion outer surface, and the container sidewall lower portion; said channel being shaped to receive therein a single file ring of the tablets oriented on a circumferential edge thereof;
(d) a retaining pin connected with said container, extending into said channel and adapted to abut tablets disposed therein and retain the same in a generally stationary state with respect to said dispensing rotor, whereby the tablets in the channel quickly fill the ring aperture for dependable dispensing thereof; and
(e) means for rotating said rotor with respect to said container, whereby a tablet is dispensed from said tablet dispenser for each alignment of said base and rotor ring apertures.

* * * * *